US005506622A

United States Patent [19]
Kim

[11] Patent Number: 5,506,622
[45] Date of Patent: Apr. 9, 1996

[54] BLOCK MATCHING TYPE MOTION VECTOR DETERMINATION USING CORRELATION BETWEEN ERROR SIGNALS

[75] Inventor: Jong-Il Kim, Seoul, Rep. of Korea

[73] Assignee: Daewoo Electronics Co., Ltd., Seoul, Rep. of Korea

[21] Appl. No.: 237,257

[22] Filed: May 2, 1994

[51] Int. Cl.$^6$ ..................................................... H04N 7/50
[52] U.S. Cl. ............................................................. 348/402
[58] Field of Search ..................................... 348/699, 700, 348/701, 416, 415, 409, 402, 401, 400, 390, 384

[56] References Cited

U.S. PATENT DOCUMENTS

| | | | |
|---|---|---|---|
| 5,025,482 | 6/1991 | Murakami et al. | 348/416 |
| 5,027,205 | 6/1991 | Avis et al. | 348/699 |
| 5,068,722 | 11/1991 | Sugiyama | 348/699 |
| 5,162,907 | 11/1992 | Keating et al. | 348/699 |
| 5,208,673 | 5/1993 | Boyce | 348/701 |
| 5,301,019 | 4/1994 | Citta | 348/416 |
| 5,327,232 | 7/1994 | Kim | 348/699 |
| 5,357,287 | 10/1994 | Koo et al. | 348/699 |

OTHER PUBLICATIONS

Staffan Ericsson, "Fixed and Adaptive Predictors for Hybrid Predictive/Transform Coding", Dec. 1985, IEEE Transactions on Communications, vol. Com–33, No. 12, pp. 1291–1302.

Yuichi Ninomiya et al., "A Motion–Compensated Interframe Coding Scheme for Television Pictures", Jan. 1982, IEEE Transactions on Communications, vol. Com–30, No. 1, pp. 201–211.

Wen–Hsiung Chen et al., "Scene Adaptive Coder", Mar. 1984, IEEE Transactions on Communications, vol. Com–32, No. 3, pp. 225–232.

Jaswant R. Jain et al., "Displacement Measurement and Its Application in Interframe Image Coding", Dec. 1981, IEEE Transactions on Communications, vol. Com–29, No. 12, pp. 1799–1808.

*Primary Examiner*—Tommy P. Chin
*Assistant Examiner*—Bryan S. Tung
*Attorney, Agent, or Firm*—Anderson Kill Olick & Oshinsky

[57] ABSTRACT

An improved method for determining optimum motion vectors of video signals employs a similarity measurement between a search block in a current frame and each of a plurality of candidate blocks included in a corresponding search region in a previous frame along with a spatial correlation measurement between pixel data in each of error signals generated from the search block and the candidate blocks. The method comprises the steps of providing error signals, calculating an error function and index of correlation for each of said error signals, and generating a motion vector corresponding to an optimum error signal determined based on error functions and indices of correlation of the error signals.

4 Claims, 5 Drawing Sheets

BLOCK MATCHING TYPE MOTION VECTOR DETERMINATION USING CORRELATION BETWEEN ERROR SIGNALS

FIELD OF THE INVENTION

The present invention relates to an improved method for determining motion vectors; and, more particularly, to an improved method for determining motion vectors from two successive video frames through the use of temporal correlationship between the frames and spatial correlationship between pixels of a motion compensated block signal.

DESCRIPTION OF THE PRIOR ART

Transmission of digitized video signals can deliver video images of much higher quality than the transmission of analog signals. When an image signal comprising a sequence of image "frames" is expressed in a digital form, a substantial amount of data is generated for transmission, especially in the case of a high definition television(HDTV) system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), quantization of DCT coefficients, and VLC(variable length coding). The motion compensated DPCM is a process of determining the movement of an object between a current frame and its previous frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications, COM*-33, No. 12, pp. 1291–1302 (December 1985); and in Ninomiya and Ohtsuka, "A Motion-Compensated Interframe Coding Scheme for Television Pictures", *IEEE Transactions on Communications, COM*-30, No. 1, pp. 201–211 (January 1982).

The two-dimensional DCT, which reduces or removes spatial redundancies between image data such as motion compensated DPCM data, converts a block of digital image data, for example, a block of 8×8 pixels, into a set of transform coefficient data. This technique is described in Chen and Pratt, "Scene Adaptive Coder", *IEEE Transactions on Communications, COM*-32, No. 3, pp. 225–232 (March 1984). By processing such transform coefficient data with a quantizer, zigzag scanning, and VLC, the amount of data to be transmitted can be effectively compressed.

Specifically, in the motion compensated DPCM, a current frame data is predicted from a previous frame data based on an estimation of the motion between the current and the previous frames. Such estimated motion may be described in terms of two dimensional motion vectors representing the displacement of pixels between the previous and the current frames.

Several methods for estimating the displacement of an object in a video sequence have been proposed. Generally, they can be classified into two types: pixel recursive algorithm and block matching algorithm(see, e.g., J. R. Jain et al., "Displacement Measurement and Its Application in Interframe Image Coding", *IEEE Transactions of Communications COM*-29, No. 12, pp. 1799–1808 (December 1981)). The present invention is primarily concerned with the block matching algorithm.

According to the block matching algorithm, a current frame is divided into a plurality of search blocks. The size of a search block typically ranges between 8×8 and 32×32 pixels. To determine a motion vector for a search block in the current frame, a similarity calculation is performed between the search block of the current frame and each of a plurality of equal-sized candidate blocks included in a generally larger search region within a previous frame. An error function such as the mean absolute error or mean square error is used to carry out a similarity measurement between the search block of the current frame and each of the candidate blocks in the search region. And a motion vector, by definition, represents the displacement between the search block and a candidate block which yields a minimum error function.

Although such a minimum error reflects a maximized temporal cross-correlation between the search block and a candidate block which yields a motion vector, it does not optimize the spatial correlation between pixels of an error signal provided by the motion compensated DPCM.

Thus, it would be advantageous to provide a method for selecting video signals for compression by way of considering the temporal relationship between adjacent frames together with the spatial relationship between pixels of an error signal, thereby improving the overall compression efficiency.

SUMMARY OF THE INVENTION

It is, therefore, an object of the present invention to provide an improved method for providing optimum motion vectors by employing a similarity measurement between a search block in a current frame and each of candidate blocks included in a corresponding search region in a previous frame along with a spatial correlation measurement between pixel data in each of error signals generated from the search block and the candidate blocks.

In accordance with the present invention, there is provided a method for determining motion vectors between a current frame and its preceding frame, wherein the current frame is divided into a plurality of search blocks of an identical size and the preceding frame is divided into a corresponding number of search regions, each search region being further divided into a multiplicity of candidate blocks of said identical size, which comprises the steps of:

(a) generating error signals, each of which representing the difference of pixel data between a search block in the current frame and each of the candidate blocks included in the search region correponding to the search block;

(b) calculating an error function and an index of correlation for each of said error signals;

(c) selecting one or more error signals based on the error functions and the indices of correlation calculated in step (b) to thereby provide one or more motion vectors, each of which representing each of said one or more error signals;

(d) reconstructing said one or more error signals, in response to the one or more motion vectors provided in step(c), from the search block and the candidate blocks included in the search region corresponding to the search block;

(e) compressing said one or more error signals reconstructed in step(d); and (f) selecting an error signal containing a least number of bits, thereby providing a motion vector corresponding to the error signal as the motion vector for the search block.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
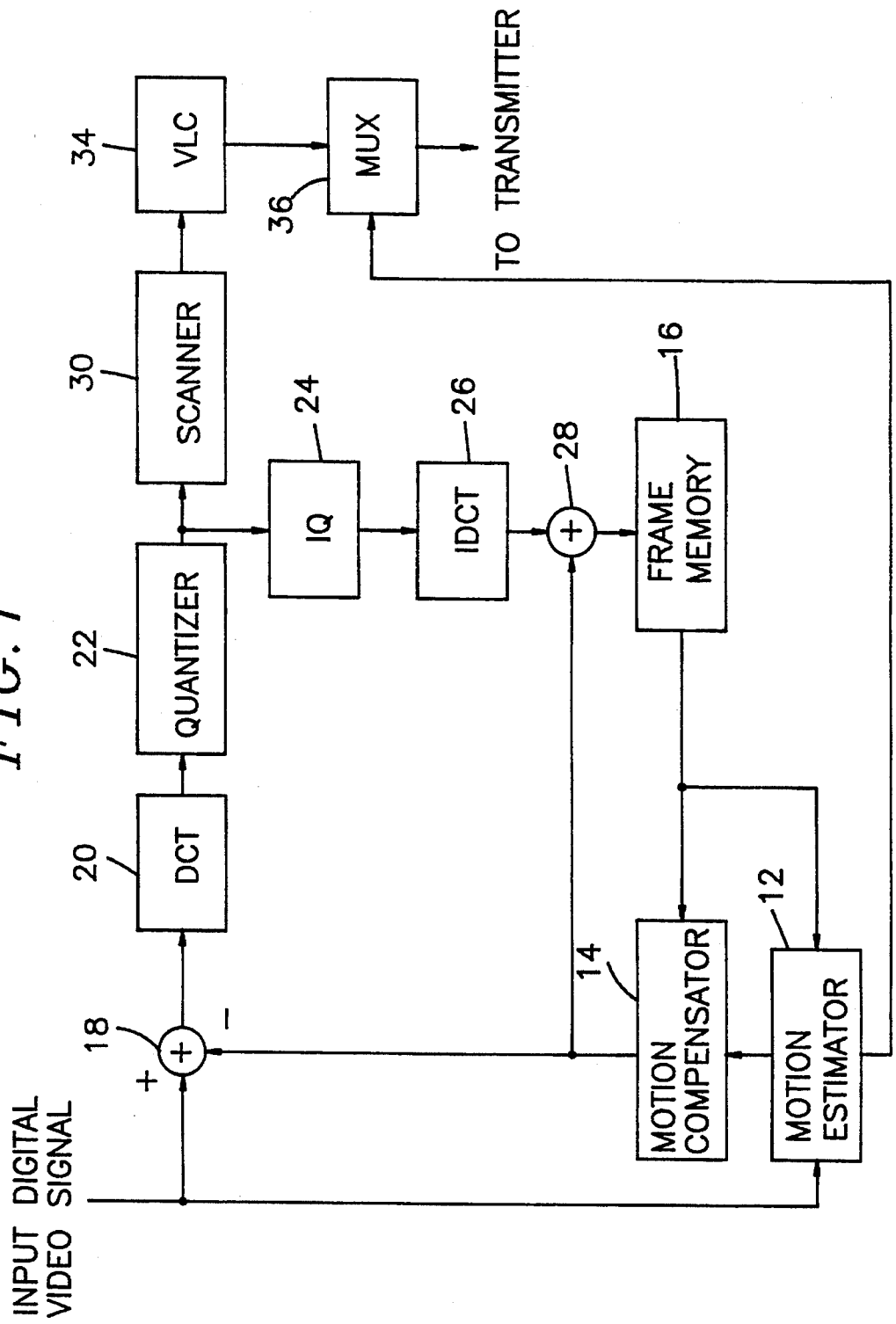
FIG. 1 illustrates a block diagram of an encoding system which comprises a motion estimator in accordance with the present invention.

Referring to FIG. 1, there is shown a block diagram of an encoding system for compressing a digital video signal, which comprises a motion estimator 12 and a motion compensator 14, of the present invention.

Current frame data is fed as an input digital video signal to a subtractor 18 and the motion estimator 12. Actually, the input digital video signal is read, on a block-by-block basis, from an input memory(not shown) wherein each frame of video signals is stored as successive blocks of pixel data for processing on a block-by-block basis. The block size of the input digital video signal typically ranges between 8×8 and 32×32 pixels.

The motion estimator 12 of the present invention determines whether a non-motion compensated block signal or a motion compensated block signal generates a least number of bits after compression, wherein the non-motion compensated block signal denotes the input digital video signal of a search block in the current frame and the motion compensated block signal is an error signal between the search block in the current frame and a candidate block included in a corresponding search region within the previous frame read from a frame memory 16. The determination is identified by a decision bit, e.g., a "0" for a non-motion compensated block signal or a "1" for a motion compensated block signal. In case a motion compensated block signal generates a least number of bits, the motion estimator 12 of the present invention also determines a motion vector corresponding to that motion compensated block signal.

Determination of a block signal which generates a least number of bits is carried out by employing the inventive motion estimation method and apparatus which will be further described hereinafter with reference to FIGS. 2 to 5.

When a non-motion compensated block signal is selected as the one generating a least number of bits by the motion estimator 12, a decision bit, e.g., "0", and a dummy motion vector are transmitted to the motion compensator 14. In this situation, motion compensation is halted and an output from the motion compensator 14 is set to zero.

Otherwise, another decision bit, e.g., "1", and a motion vector are fed to the motion compensator 14. The motion vector indicates the location of a candidate block corresponding to a motion compensated block signal which generates a least number of bits. In response to the decision bit and the motion vector, a prediction signal, i.e., pixel data of the candidate block corresponding to the motion vector is extracted from the frame memory 16 and provided to the subtractor 18 and an adder 28 by the motion compensator 14.

In both cases, a decision bit, e.g., "0" or "1", is applied to a multiplexer 36 and is also multiplexed together with an encoded video signal for transmission, thereby allowing a receiver(or decoder) thereof to determine whether a received block of encoded data is motion compensated or not.

The "0" or prediction signal from the motion compensator 14 is subtracted from the input digital video signal at the subtractor 18; and the resultant data, i.e., an error signal, is dispatched to a transform coder, e.g., a DCT coder 20, wherein a block of the error signal, for instance, a block of 8×8 pixel data, is encoded into a block of transform coefficient data. It should be noted that the error signal used herein implies either the input digital video signal, i.e., the non-motion compensated block signal, or a difference signal, i.e., a motion compensated block signal, between the input digital video signal and the prediction signal generated by the motion compensator 14. Those skilled in the art will appreciate that other transform techniques may be employed in lieu of the DCT described herein.

At a quantizer 22, the transform coefficients from the DCT coder 20 are quantized into a set of quantized DCT coefficients which is subsequently fed to a scanner 30 and an inverse quantizer(IQ) 24. The quantized DCT coefficients are converted back to a set of DCT coefficients at the IQ 24. The set of DCT coefficients is then applied to an inverse discrete cosine transformer(IDCT) 26 and transformed therein into a block of pixel data. At the adder 28, the signal, i.e., the "0" or prediction signal, from the motion compensator 14 and the block of pixel data from IDCT 26 are summed to provide a reconstructed block signal of the current frame to be written onto the frame memory 16. The frame memory 16 has two frame memory locations storing the current and the previous frame data. The output signal from the adder 28 comprises blocks of pixel data. When all of the blocks representing the current frame are stored in the frame memory 16, new frame data is provided from the adder 28. At this moment, the new data is referred to as a current frame and the current frame data previously stored in the frame memory 16 is referred to as the previous frame.

In the meantime, the quantized DCT coefficients from the quantizer 22 are transferred to the scanner 30 which scans the quantized DCT coefficients in, e.g., a zigzag fashion appropriate for such a statistical coder as a VLC coder 34, starting from a value corresponding to the DC component of the DCT coefficients. The VLC coder 34 converts the scanned data into a set of variable length coded data. The VLC coder 34 is basically a look-up table: that is, in the VLC coder 34, a plurality of code sets is provided to define a respective relationship between each set of a zeros runlength and a level of the quantized DCT coefficients and its variable length code.

A level is a quantized DCT coefficient with a non-zero value and a zeros run-length refers to the total number of successive zeros preceding the level in the scanning sequence. It should be noted that other statistical coding techniques may be employed in lieu of the VLC described herein. The encoded data from the VLC coder 34 and a decision bit from the motion estimator 12 are multiplexed at the multiplexer 36 for data transmission.

Figure 2:
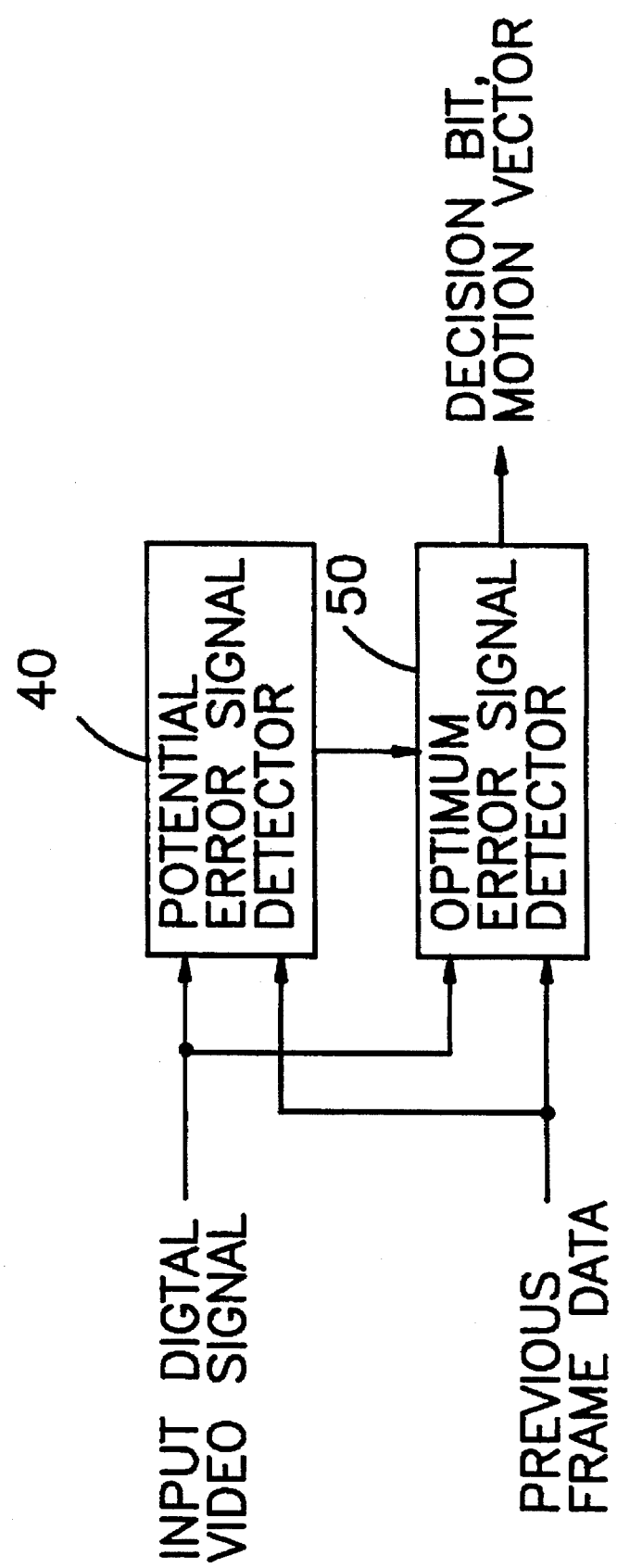
FIG. 2 shows a block diagram of the motion estimator shown in FIG. 1, comprising a potential error signal detector and an optimum error signal detector.

Referring to FIG. 2, there is illustrated a block diagram, in accordance with the present invention, of the motion estimator 12 depicted in FIG. 1. Both of the input digital video signal, i.e., the signal of the search block of the current frame, and the previous frame data, i.e., block signals of a plurality of candidate blocks in a corresponding search region of the previous frame read from the frame memory 16 in FIG. 1 are fed to a potential error signal detector 40 and an optimum error signal detector 50 which are incorporated in the motion estimator 12 shown in FIG. 1.

The potential error signal detector 40 selects a maximum of p potential error signals which will be processed in the optimum error signal detector 50 for selecting an optimum error signal generating a least number of bits, wherein p is a predetermined number. Details of the potential error signal detector will be described later with reference to FIGS. 3 and 4. For each of the maximum of p potential error signals, the potential error signal detector 40 outputs a decision bit and a motion vector to the optimum error signal detector 50.

In response to the outputs from the potential error signal detector 40, the optimum error signal detector 50 calculates the number of bits for each of the potential error signals, to thereby determine the optimum error signal generating the least number of bits. Outputs from the optimum error signal detector 50 are a decision bit to the motion compensator 14 and the multiplexer 36 and a motion vector to the motion compensator 14 as described in FIG. 1. Details of the optimum error signal detector 50 will be described in conjunction with FIG. 5.

Figure 3:
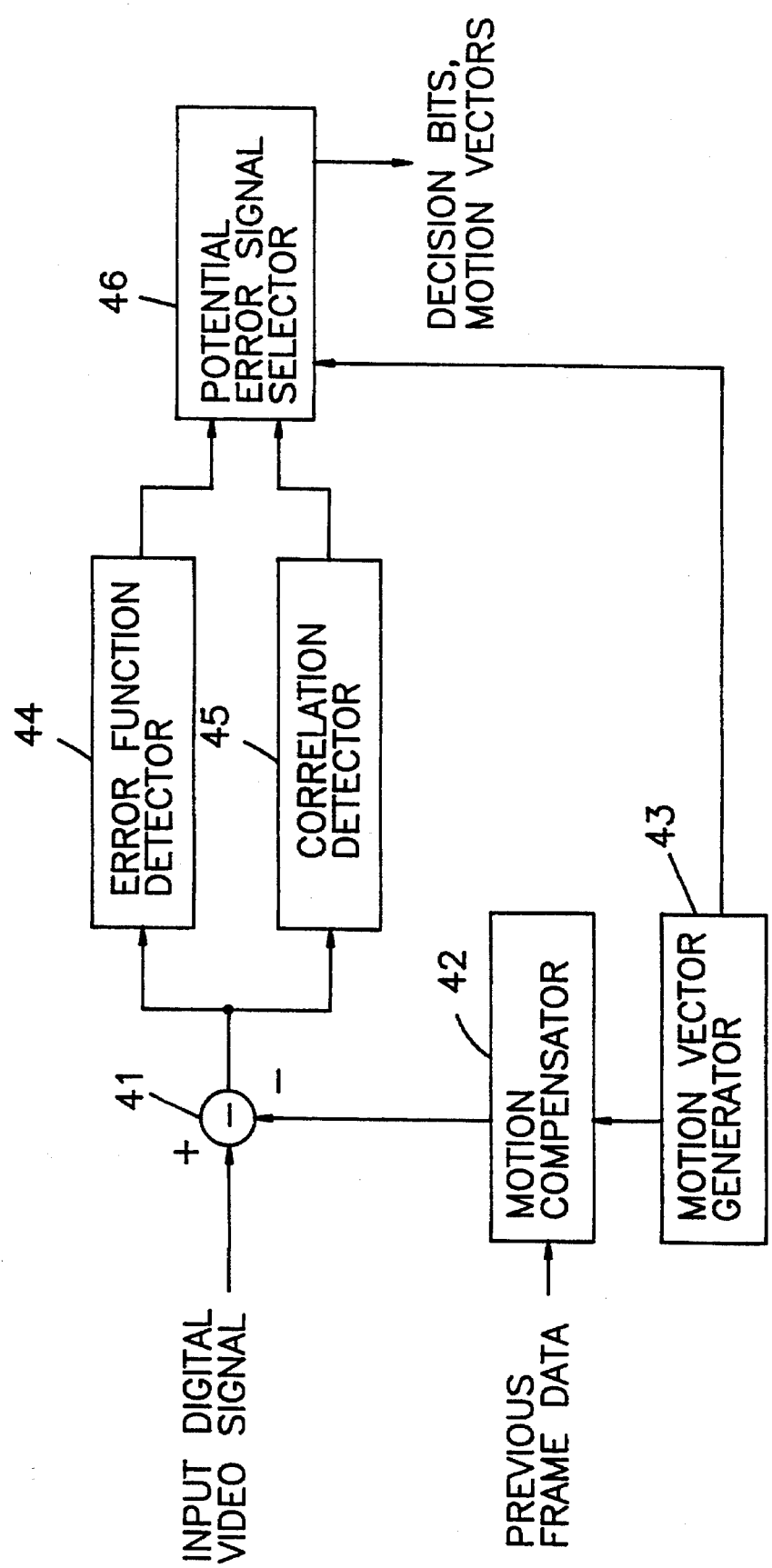
FIG. 3 depicts a detailed block diagram of the potential error signal detector illustrated in FIG. 2.
Figure 4:
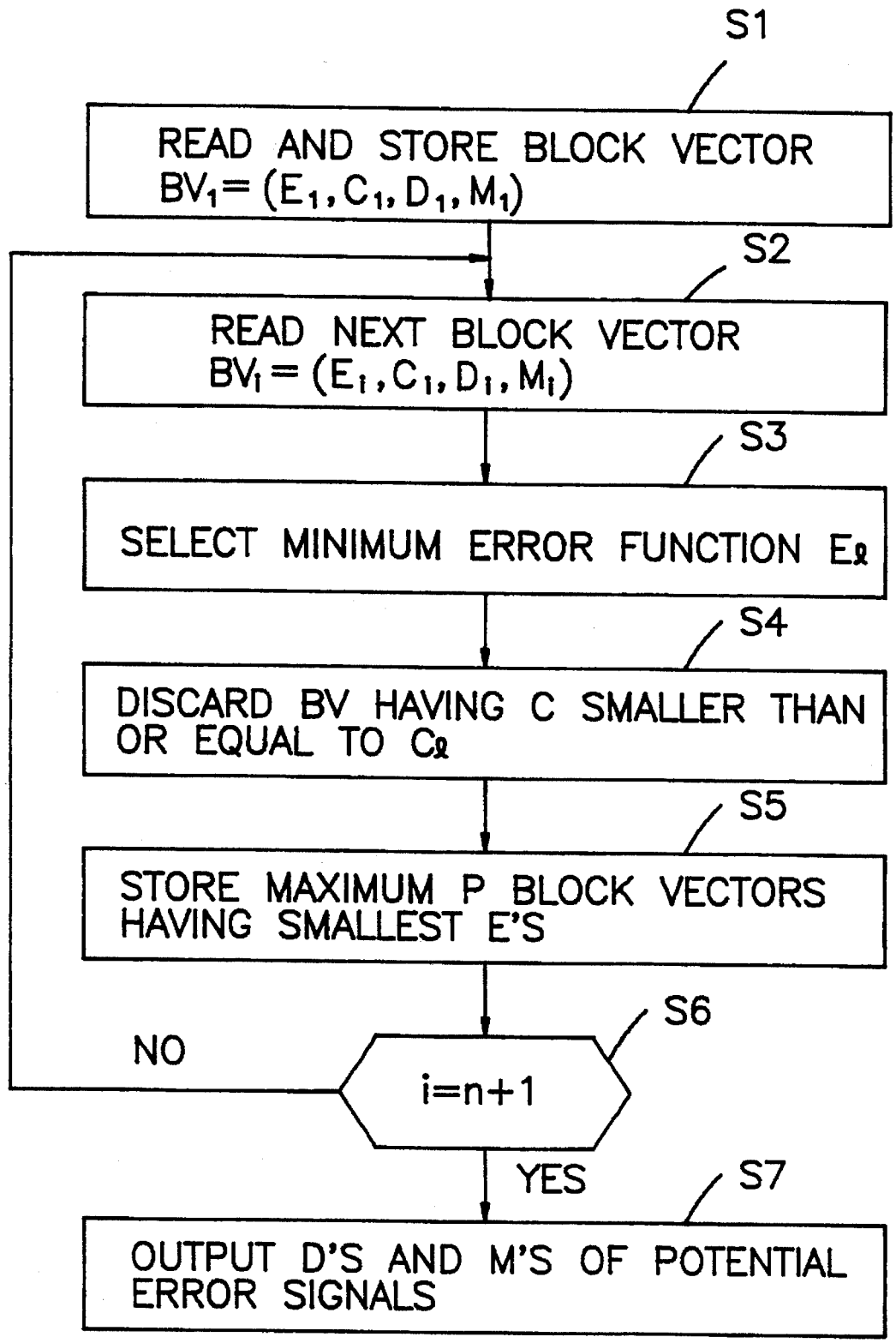
FIG. 4 represents a flow chart explaining a procedure carried out in a potential error signal selector in FIG. 3 for determining potential error signals in accordance with the invention.

FIG. 3 illustrates the details of the potential error signal detector 40 shown in FIG. 2 in accordance with the preferred embodiment of the present invention. The input digital video signal and the previous frame data from the frame memory 16 in FIG. 1 are fed to a subtractor 41 and to a motion compensator 42, respectively. A motion vector generator 43 feeds sets of a decision bit and a motion vector to the motion compensator 42 and a potential error signal selector 46. Specifically, the motion vector generator 43 provides (n+1) sets of signals comprising a set of a decision bit and a dummy motion vector for processing the non-motion compensated block signal, i.e., the input digital video signal representing a search block of the current frame, and n sets of another decision bit and a motion vector for processing motion compensated block signals obtained from the search block of the current frame and each of n candidate blocks in the corresponding search region of the previous frame. The motion compensator 42 is equivalent to the motion compensator 14 shown in FIG. 1. That is, it provides the subtractor 41 with a "0" signal or a prediction signal in response to each set of a decision bit and a motion vector provided from the motion vector generator 43. Error signals, which are provided by subtracting a "0" or prediction signals generated by the motion compensator 42 from the input digital video signal, are applied from the subtractor 41 to an error function detector 44 and a correlation detector 45.

The error function detector 44 calculates an error function for each of the error signals and transfers each calculated error function to the potential error signal selector 46. The error function, which is a measure of similarity, i.e., of temporal correlation, between the search block and its candidate block, is normally expressed by the mean absolute error or the mean square error of the error signal. Although the mean absolute error is used as an exemplary embodiment of the invention, it should be noted that other error functions such as a variance function may be successfully employed in order to practice the present invention as long as it provides a measure of temporal correlation between adjacent frames. The error function used herein can be interpreted as representing an overall magnitude of pixel data of an error signal. The mean absolute error of an error signal representing block i may be defined as:

$$E_i = \frac{1}{MN} \sum_{t=1}^{N} \sum_{s=1}^{M} |I(s,t)| \qquad \text{Eq. (1)}$$

wherein $I(s,t)$ is a pixel data, e.g., a luminance level of a pixel, residing at column s and row t in the block i of M×N, e.g., 16×16, pixels.

In the meanwhile, the correlation detector 45 determines the index of correlation, e.g., the average correlation coefficient, of the block i from the horizontal and vertical correlation coefficients thereof. The horizontal correlation coefficient may be calculated by averaging the correlation coefficients for each row in the block i as:

$$C_{i,h} = \frac{1}{N} \sum_{t=1}^{N} |C_{i,h,t}| \qquad \text{Eq. (2)}$$

wherein $C_{i,h}$ denotes a horizontal correlation coefficient of the block i; N, the number of rows thereof; and $C_{i,h,t}$, a correlation coefficient of row t thereof.

The correlation coefficient for row t, $C_{i,h,t}$, may be defined as:

$$C_{i,h,t} = \frac{\frac{1}{M-m} \sum_{s=1}^{M-m} \{I(s,t) - \text{mean}_t\}\{I(s+m,t) - \text{mean}_t\}}{\frac{1}{M} \sum_{s=1}^{M} \{I(s,t) - \text{mean}_t\}^2} \qquad \text{Eq. (3)}$$

wherein M is the number of columns in the block i; m, a positive integer ranging from 1 to (M−1); $I(s,t)$ and $I(s+m,t)$, the pixel data situated at columns s and (s+m) in row t, respectively; and $\text{mean}_t$, the average pixel data in row t defined by Eq.(4) as:

$$\text{mean}_t = \frac{1}{M} \sum_{s=1}^{M} I(s,t) \qquad \text{Eq. (4)}$$

Similarly, the vertical correlation coefficient $C_{i,v}$ is calculated by averaging the correlation coefficients for each column in the block i as:

$$C_{i,v} = \frac{1}{M} \sum_{s=1}^{M} |C_{i,v,s}| \qquad \text{Eq. (5)}$$

wherein $C_{i,v}$ denotes the vertical correlation coefficient of the block i; M, the number of columns thereof; and $C_{i,v,s}$, the correlation coefficient of column s thereof.

The correlation coefficient for column s, $C_{i,v,s}$, may be defined as:

$$C_{i,v,s} = \frac{\frac{1}{N-m'} \sum_{t=1}^{N-m'} \{I(s,t) - \text{mean}_s\}\{I(s,t+m') - \text{mean}_s\}}{\frac{1}{N} \sum_{t=1}^{N} \{I(s,t) - \text{mean}_s\}^2} \qquad \text{Eq. (6)}$$

wherein (N−1) is the number of rows in the block i; m', a positive integer ranging from 1 to N; $I(s,t)$ and $I(s,t+m')$, the pixel data situated at rows t and (t+m') in column s, respectively; and mean$_s$, the average pixel data in column s defined by Eq.(7) as:

$$\text{mean}_s = \frac{1}{N} \sum_{t=1}^{N} I(s,t) \qquad \text{Eq. (7)}$$

The average correlation coefficient of the block i may be defined as:

$$C_i = \frac{1}{2}(C_{i,h} + C_{i,v}) \qquad \text{Eq. (8)}$$

$C_i$, which has a value between 0 and 1 with an implication that the greater the value $C_i$, the better the correlation will be, is fed to the potential error signal selector 46. It should be appreciated that any other index of correlation, which represents the spatial correlation between pixels of a block, can be employed in lieu of the average correlation coefficient described above.

Figure 5:
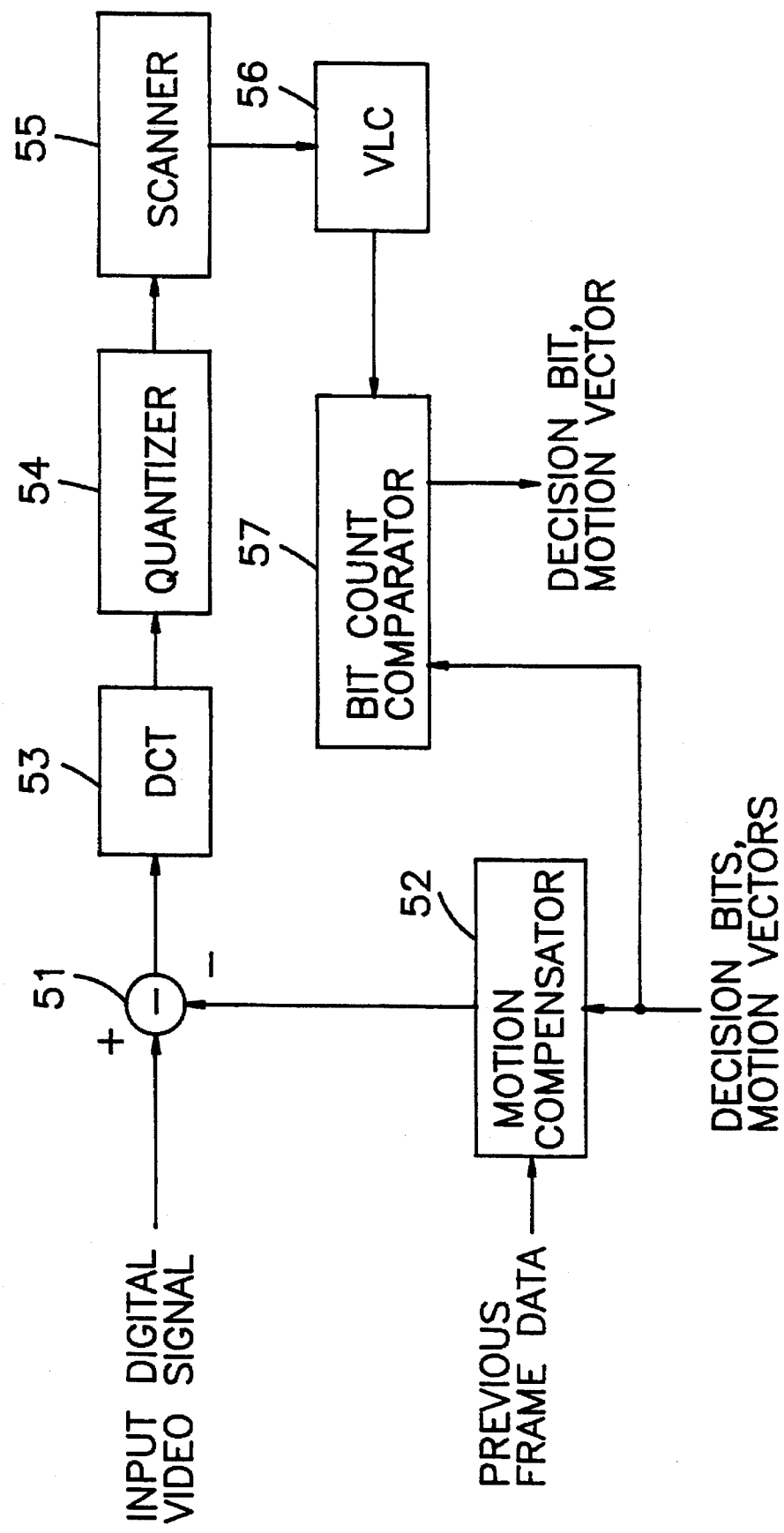
FIG. 5 schematically describes details of the optimum error signal detector shown in FIG. 2.

Referring to the potential error signal selector 46, a set of a decision bit and a motion vector for each of the maximum of p potential error signals are outputted to the optimum error signal detector 50 as shown in FIG. 2, specifically to a motion compensator 52 and a bit count comparator 57 in FIG. 5. Selection of the potential error signals is carried out in the potential error signal selector 46 in accordance with the procedure depicted in FIG. 4.

A first block vector $BV_1=(E_1, C_1, D_1, M_1)$ of a first error signal is read and stored in step S1, wherein $E_1$ is an error function, e.g., a mean absolute error, from the error function detector 44; $C_1$, an average correlation coefficient from the correlation detector 45, and $D_1$ and $M_1$, a decision bit and a motion vector, respectively, from the motion vector generator 43. In step S2, a next block vector $BV_j=(E_j, C_j, D_j, M_j)$ is read. Subsequently, in step S3, a minimum error function $E_l$ is determined from $E_i$ read in step S2 and $E_j$, error function(s) of block vector(s), stored in its previous step, i.e., in step S1 or S5. The total number of $E_j$ is not larger than p, wherein p is the predetermined number, e.g., 3. When more than one error functions of a same value exist, an error function of a block vector having a largest average correlation coefficient is selected as an $E_l$. The average correlation coefficient of the block vector having $E_l$ is set to $C_l$.

In step S4, any block vector having an average correlation coefficient C which is not larger than $C_l$ is discarded. In the following step S5, block vectors are stored in an ascending order of the error functions with a condition that the maximum number of the selected block vectors be not larger than a predetermined number p. In step S6, it is checked whether i is equal to (n+1), wherein (n+1) denotes the total number of error signals, i.e., one non-motion compensated block signal and n motion compensated block signals, n being a number of the candidate blocks in the corresponding search region of the previous frame.

If i is not equal to (n+1), that is, i is smaller than (n+1), the sequence returns to step S2. If i=n+1, it is implied that all the error signals have been processed; the maximum of p block vectors stored in step S5 are potential error signals; and a set of a decision bit and a motion vector for each of the potential error signals is outputted in step S7 to the bit count comparator 57 and the motion compensator 52 incorporated in the optimum error signal detector 50 as shown in FIG. 5. The maximum of p potential error signals comprise an error signal having a least error function and are selected in the ascending order of the error functions with a condition that other selected error signals have correlation coefficients larger than that of the error signal having a least error function.

Details of the optimum error signal detector 50 shown in FIG. 2 are illustrated in FIG. 5. The input digital video signal is fed to a subtractor 51 and each set of a decision bit and a motion vector from the potential error signal selector 46 in FIG. 3 and the previous frame data are transferred to the motion compensator 52. The motion compensator 52 performs the same function as the one of the motion compensator 42 in the potential error signal detector 40 as shown in FIG. 3. It provides the subtractor 51 with a zero or prediction signal, in response to each set of a decision bit and a motion vector fed thereto. An error signal is provided in the subtractor 51 by subtracting the zero or prediction signal generated by the motion compensator 52 from the input digital video signal, and dispatched to a DCT coder 53 which converts a block of error signal, e.g., a block of 8×8 pixel data, into a block of transform coefficient data.

The block of transformed data from the DCT coder 53 is quantized into a block of quantized DCT coefficients by a quantizer 54 and transferred to a scanner 55 wherein the block of quantized DCT coefficients is scanned, e.g., in a zigzag fashion, starting from a value corresponding to the DC component of the DCT coefficients. A set of scanned data from the scanner 55 is encoded into a set of variable length coded data by a VLC coder 56. The VLC coder 56 is basically a look-up table; that is, a plurality of code sets is provided, as well known in the art, in the VLC coder 56 to define a respective relationship between each set of the zeros run-length and level of the quantized DCT coefficients and its variable length code.

Variable length codes for each potential error signal are transferred to the bit count comparator 57 and the total number of bits for each potential error signal is counted therein. The bit count comparator 57 compare the numbers of bits of all the potential error signals with each other and selects an error signal having a least number of bits as an optimum error signal. Outputs from the bit count comparator 57 to the motion compensator 14 in FIG. 1 is a set of a decision bit and a motion vector of the optimum error signal selected therein.

While the preferred embodiments of the invention have been described the with reference to motion estimator 12 for determining the optimum error signal out of the non-motion compensated block signal and motion compensated block signals, it should be noted that the method disclosed herein can be employed as well in selecting an optimum error signal only from the motion compensated block signals.

It should be appreciated that any other transform techniques than DCT and other statistical coding schemes than VLC may be beneficially employed.

Further, it is noted that the motion compensator 52, subtractor 51, DCT coder 53, quantizer 54, scanner 55, and VLC coder 56 in FIG. 5 are equivalent to those employed in FIG. 1 so that the optimum error signal selected in the bit count comparator 57 can provide the least number of bits after carrying out the encoding process shown in FIG. 1.

While the present invention has been described with reference to the particular embodiments, it will be apparent to those skilled in the art that various changes and modifications may be made without departing from the spirit and scope of the invention as defined in the following claims.

What is claimed is:

1. A method for determining motion vectors between a current frame and its preceding frame of video signals, wherein the current frame is divided into a plurality of search blocks of an identical size and the preceding frame is divided into a corresponding number of search regions, each search region being further divided into a multiplicity of candidate blocks of said identical size, which comprises the steps of:

(a) generating motion vectors, each of which represents the displacement of pixels between the search block and each of the multiplicity of candidate blocks in the search region corresponding to said search block;

(b) producing prediction signals, in response to the motion vectors generated in step (a), each of said prediction signals corresponding to the pixel data for each of the candidate blocks;

(c) subtracting each of said prediction signals from the pixel data of the search block, thereby providing the error signals;

(d) calculating an error function and an index of correlation for each of said error signals, wherein i) said error function is a mean absolute error defined as:

$$E_i = \frac{1}{MN} \sum_{t=1}^{N} \sum_{s=1}^{M} |I(s,t)|$$

wherein $E_i$ is the mean absolute error of an error signal representing a block i; $I(s,t)$ represents the pixel data at column s and row t in the block i of M×N pixels; and ii) said index of correlation is an average correlation coefficient defined as:

$$C_i = \frac{1}{2}(C_{i,h} + C_{i,v})$$

wherein $C_i$ is the average correlation coefficient of the error signal representing the block i; $C_{i,h}$, a horizontal correlation coefficient of the block i; and $C_{i,v}$, a vertical correlation coefficient of the block i, $C_{i,h}$ being defined as:

$$C_{i,h} = \frac{1}{N} \sum_{t=1}^{N} \left| \frac{\frac{1}{M-m} \sum_{s=1}^{M-m} \{I(s,t) - \text{mean}_t\}\{I(s+m,t) - \text{mean}_t\}}{\frac{1}{M} \sum_{s=1}^{M} \{I(s,t) - \text{mean}_t\}^2} \right|$$

wherein N is the number of rows in the block i; M is the number of columns in the block i; m is a positive integer ranging from 1 to (M−1); $I(s+m,t)$ is the pixel data at column (s+m) and row t; and $\text{mean}_t$ is an average pixel data in row t defined by $$\text{mean}_t = \frac{1}{M} \sum_{s=1}^{M} I(s,t);$$

and $C_{i,v}$ being defined as:

$$C_{i,v} = \frac{1}{M} \sum_{s=1}^{M} \left| \frac{\frac{1}{N-m'} \sum_{t=1}^{N-m'} \{I(s,t) - \text{mean}_s\}\{I(s,t+m') - \text{mean}_s\}}{\frac{1}{N} \sum_{t=1}^{N} \{I(s,t) - \text{mean}_s\}^2} \right|$$

wherein m' is a positive integer ranging from 1 to (N−1); $I(s, t+m')$ represents the pixel data at row (t+m') in column s; and $\text{mean}_s$ is an average pixel data in column s defined by $$\text{mean}_s = \frac{1}{N} \sum_{t=1}^{N} I(s,t);$$

(e) selecting one or more error signals capable of providing a least number of bits after compression such that said one or more error signals comprise an error signal having a minimum error function and are selected in the ascending order of the error functions, other selected error signals than said error signal having the minimum error function have indices of correlation larger than that of said error signal having the minimum error function, and the total number of said one or more error signals does not exceed a predetermined number, to thereby provide one or more motion vectors, each of which represents each of said selected one or more error signals;

(f) producing prediction signals, each of the prediction signals corresponding to the pixel data of a candidate block represented by each of the motion vectors produced in step (e);

(g) subtracting each of the prediction signals produced in step (f) from the pixel data of the search block, thereby reconstructing said one or more error signals selected in step (e);

(h) transform-coding each of said reconstructed one or more error signals by using the discrete cosine transform, thereby producing a set of transform coefficients;

(i) quantizing said set of transform coefficients into a set of quantized transform coefficients;

(j) scanning said set of quantized transform coefficients, to thereby produce a sequence of quantized transform coefficients;

(k) statistically coding said sequence of quantized transform coefficients by using the variable length coding, to thereby provide one or more statistically coded error signals;

(l) counting the number of bits for each of the one or more statistically coded error signals;

(m) comparing the numbers of bits counted in step (l) with each other; and (n) selecting an error signal containing the least number of bits, to thereby provide a motion vector corresponding to said selected error signal as the motion vector for the search block.

2. The method in accordance with claim 1, excepting that said error function is a mean square error.

3. A method for determining optimum video signals for compression from a current frame and its preceding frame of video signals, wherein the current frame is divided into a plurality of search blocks of an identical size and the preceding frame is divided into a corresponding number of search regions, each search region being further divided into a multiplicity of candidate blocks of said identical size, which comprises the steps of:

(a) generating control signals, wherein one of said control signals comprises a first decision bit provided for processing a non-motion compensated block signal, and each of the other control signals comprises a second decision bit for processing a motion compensated block signal and a motion vector representing a displacement of pixels between the search block and each of the candidate blocks in the search region corresponding to said search block;

(b) producing a zero signal in response to said one of the control signals and the multiplicity of prediction signals in response to said other control signals, each of the multiplicity of prediction signals representing pixel data for each of the candidate blocks corresponding to each motion vector included in said other control signals;

(c) subtracting said zero signal and said each of the prediction signals from the pixel data of the current frame, to thereby provide error signals;

(d) calculating an error function and an index of correlation for each of said error signals, wherein
  i) said error function is a mean absolute error defined as:

$$E_i = \frac{1}{MN} \sum_{t=1}^{N} \sum_{s=1}^{M} |I(s,t)|$$

wherein $E_i$ is the mean absolute error of an error signal representing a block i; I(s,t), is the pixel data at column s and row t in the block i of M×N pixels; and
  ii) said index of correlation is an average correlation coefficient defined as:

$$C_i = \frac{1}{2}(C_{i,h} + C_{i,v})$$

wherein $C_i$ is the average correlation coefficient of the error signal representing the block i; $C_{i,h}$, a horizontal correlation coefficient of the block i; and $C_{i,v}$, a vertical correlation coefficient of the block i, $C_{i,h}$ being defined as:

$$C_{i,h} = \frac{1}{N} \sum_{t=1}^{N} \left| \frac{\frac{1}{M-m} \sum_{s=1}^{M-m} \{I(s,t) - \text{mean}_t\}\{I(s+m,t) - \text{mean}_t\}}{\frac{1}{M} \sum_{s=1}^{M} \{I(s,t) - \text{mean}_t\}^2} \right|$$

wherein N is the number of rows in the block i; M is the number of columns in the block i; m is a positive integer ranging from 1 to (M−1); I(s+m,t) represents the pixel data at column (s+m) in row t; and $\text{mean}_t$ is the average pixel data in row t defined by $$\text{mean}_t = \frac{1}{M} \sum_{s=1}^{M} I(s,t);$$

and $C_{i,v}$ being defined as:

$$C_{i,v} = \frac{1}{M} \sum_{s=1}^{M} \left| \frac{\frac{1}{N-m'} \sum_{t=1}^{N-m'} \{I(s,t) - \text{mean}_s\}\{I(s,t+m') - \text{mean}_s\}}{\frac{1}{N} \sum_{t=1}^{N} \{I(s,t) - \text{mean}_s\}^2} \right|$$

wherein m' is a positive integer ranging from 1 to (N−1); I(s, t+m') represents the pixel data at row (t+m') in column s; and $\text{mean}_s$ is an average pixel data in column s defined by $$\text{mean}_s = \frac{1}{N} \sum_{s=1}^{N} I(s,t);$$

(e) selecting one or more error signals capable of providing a least number of bits after compression such that said one or more error signals comprise an error signal having a minimum error function and are selected in the ascending order of the error functions, other selected error signals than said error signal having the minimum error function have the indices of correlation larger than that of said error signal having the minimum error function, and the total number of said one or more error signals does not exceed a predetermined number, to thereby provide one or more control signals, each of which representing each of said one or more error signals;

(f) producing a zero or prediction signal in response to each of the control signals provided in step (e);

(g) subtracting said zero or prediction signal produced in step (f) from the pixel data of the search block, thereby reconstructing said one or more error signals determined in step (e);

(h) transform-coding each of said reconstructed one or more error signals by using the discrete cosine transform, thereby producing a set of transform coefficients;

(i) quantizing said set of transform coefficients into a set of quantized transform coefficients;

(j) scanning said set of quantized transform coefficients, to thereby produce a sequence of quantized transform coefficients;

(k) statistically coding said sequence of quantized transform coefficients by using the variable length coding, to thereby provide one or more statistically coded error signals;

(l) counting the number of bits for each of said one or more statistically coded error signals;

(m) comparing the numbers of bits counted in step (l) with each other;

(n) selecting an error signal containing the least number of bits, thereby providing a control signal corresponding to said error signal containing the least number of bits as the control signal for the search block; and (o) providing a zero or prediction signal in response to the control signal provided in step (n).

4. The method in accordance with claim 3, excepting that said error function is a mean square error.

* * * * *